United States Patent [19]

Pav

[11] Patent Number: 4,805,279

[45] Date of Patent: Feb. 21, 1989

[54] PRESSURE ROLL FOR USE IN CALENDERS AND THE LIKE

[75] Inventor: Josef Pav, Krefeld, Fed. Rep. of Germany

[73] Assignee: Kleinewefers GmbH, Krefeld, Fed. Rep. of Germany

[21] Appl. No.: 92,298

[22] Filed: Sep. 2, 1987

[51] Int. Cl.$^4$ .............................................. B21B 13/02
[52] U.S. Cl. .................................................. 29/116.2
[58] Field of Search ...................... 29/116 R, 116 AD; 384/99, 100

[56] References Cited

U.S. PATENT DOCUMENTS

| | | | |
|---|---|---|---|
| 3,131,625 | 5/1964 | Küsters et al. .................... | 100/170 |
| 3,587,152 | 6/1971 | Hold ............................... | 29/116 AD |
| 4,228,571 | 10/1980 | Biondetti ......................... | 29/116 AD |
| 4,280,262 | 7/1981 | Ahrweiler ........................ | 29/116 AD |
| 4,394,793 | 7/1983 | Pav et al. ........................ | 29/116 AD |
| 4,520,723 | 6/1985 | Pav et al. ........................ | 29/116 AD X |
| 4,556,454 | 12/1985 | Dahl et al. ...................... | 29/116 AD |
| 4,570,314 | 2/1986 | Holik et al. .................... | 29/116 R X |
| 4,661,206 | 4/1987 | Heitmann et al. ............... | 29/116 AD X |
| 4,679,287 | 7/1987 | Allard ............................ | 29/116 AD |

FOREIGN PATENT DOCUMENTS

| | | |
|---|---|---|
| 0115790 | 8/1984 | European Pat. Off. . |
| 2420324 | 10/1975 | Fed. Rep. of Germany . |
| 2230139 | 1/1980 | Fed. Rep. of Germany . |
| 3011669 | 10/1981 | Fed. Rep. of Germany . |

*Primary Examiner*—Mark Rosenbaum
*Assistant Examiner*—Frances Chin
*Attorney, Agent, or Firm*—Peter K. Kontler

[57] ABSTRACT

A pressure roll for use in calenders has a fixed carrier for a hollow cylindrical shell which is rotatable about and is movable radially of the carrier. The position of the shell relative to the carrier and the positions of longitudinal increments of the shell relative to each other are regulated by one or more supporting devices each of which has a row of neighboring hydrostatic bearing elements having convex surfaces with pockets adjacent the internal surface of the shell and being urged against the shell by discrete cylinder and piston units, one for each bearing element. Each bearing element has an elongated elliptical or rectangular outline and has a width in the circumferential direction of the shell which greatly exceeds its length in the axial direction of the shell. Each cylinder and piston unit has a piston whose cross-sectional outline equals or approximates that of the respective bearing element and which is only slightly smaller than the respective bearing element. The pistons are mounted on the carrier and extend into complementary cylinder chambers in the adjacent inner sides of the respective bearing elements. The cylinder and piston units can receive a heated hydraulic fluid at a controlled pressure. The relatively wide but short pistons ensure that the bearing elements can stand large deforming stresses.

16 Claims, 3 Drawing Sheets

PRESSURE ROLL FOR USE IN CALENDERS AND THE LIKE

BACKGROUND OF THE INVENTION

The invention relates to pressure rolls which can be used in calenders, rolling mills, pulleys for running webs of paper, textile material, metallic or plastic foil, sheets or webs of steel, aluminum or other metals, in paper-making machines and for analogous purposes.

U.S. Pat. No. 3,131,625 to Kusters et al. discloses a roll for the pressure treatment of paper and other web material wherein a hollow cylindrical shell is rotatable about and is movable radially relative to an elongated carrier which is non-rotatably mounted in the frame of a paper making or paper processing machine. Selected portions of the shell can be deformed (so as to regulate the profile of the nip between the roll and an adjacent roll) by hydrostatic bearing elements each of which extends in the circumferential direction of the shell along an arc exceeding 90 degrees. The bearing elements form a row which extends in parallelism with the axis of the shell. The means for biasing the convex external surfaces of the bearing elements against the adjacent portions of the internal surface of the shell comprises cylinder and piston units which are connected or connectable to a source of pressurized hydraulic fluid. The pistons of such units are reciprocable in cylinder chambers which are machined into the carrier, and each piston has a relatively small projection which is received in a socket at the inner side of the respective bearing element. The convex surface of each bearing element is formed with a large number of small pockets and with a centrally located large pocket which receives pressurized hydraulic fluid by way of a bore in the respective piston and its projection. The shell of the patented roll is relatively thin so that it can be deformed by selected bearing elements.

A drawback of the patented roll is that the projections of the pistons act only upon the central portions of the respective hydrostatic bearing elements, i.e., the major portion of each bearing element is ineffective as far as the regulation of the shape of the adjacent portion of the shell is concerned. Moreover, the peripheral portions of the bearing elements are relatively thin and readily deformable so that they cannot offer a pronounced resistance to undesirable deformation of adjacent portions of the shell and are actually likely to be deformed by the shell. Therefore, the patented roll cannot regulate, with a relatively high degree of precision, the width of the nip or nips which is or are defined with the neighboring roll or rolls.

German Auslegeschrift No. 22 30 139 of Spillmann et al. discloses a pressure roll wherein the hydrostatic bearing elements extend beyond both sides of the plane including the axis of the shell and halving the nip. However, the pistons of the cylinder and piston units which are used to urge the bearing elements against the internal surface of the shell are relatively small and act only upon the central portions of the respective bearing elements. This exhibits the aforediscussed drawbacks as concerns the ability of the bearing elements to control the configuration of adjacent portions of the shell. The Auslegeschrift proposes to employ bearing elements having a circular outline or bearing elements having a rectangular outline and extending in parallelism with the axis of the shell.

The just described conventional rolls share the drawback that the magnitude of the load which can be taken up per unit length of the shell is rather limited and is determined by the available or permissible maximum pressure of the hydraulic fluid. If the bearing elements have a circular outline, they can extend well beyond both sides of the plane which includes the axes of the shell and the adjacent roll (namely of the roll which cooperates with the shell to define a nip). However, the number of discrete bearing elements must be reduced proportionally with an increase in their diameter so that the shape of the shell cannot be regulated with a high degree of accuracy. This will be readily appreciated by bearing in mind that the length of those portions of the shell which can be adjusted independently of the other portions (as seen in the axial direction of the shell) will increase proportionally with the number of bearing elements which form a row extending in parallelism with the axis of the roll.

The drawbacks of elongated rectangular bearing elements which extend in parallelism with the axis of the shell are even more serious. Thus, if the bearing elements are relatively long, they cannot bring about an accurate adjustment of relatively short portions of the shell if they can permit any adjustments at all. All such elongated bearing elements can do is to jointly shift the entire shell radially of its carrier in order to widen or narrow the nip which is defined with the neighboring roll. Furthermore, such elongated bearing elements cannot be used in conjunction with relatively thin shells because they are likely to permanently and excessively deform the shell in response to admission of pressurized hydraulic fluid into the respective cylinder and piston units. The shell is likely to develop pronounced facets which extend in the longitudinal direction of the carrier and define ridges which affect the quality and/or integrity of the conveyed material.

U.S. Pat. No. 3,587,152 to Held discloses a pressure roll wherein the supporting device for the shell comprises two rows of hydrostatic bearing elements disposed at opposite sides of and spaced apart from the plane including the axes of cooperating rolls. Reference may be had to FIG. 2 of the patent which shows that the two rows of bearing elements are disposed substantially at the 1½ and 10½ o'clock positions of the shell and are remote from the plane including the axes of the shell and of the roll above the shell. Thus, the two rows of bearing elements cannot adequately support the shell at the most important location, namely immediately adjacent the nip.

European patent application No. 0 115 790 of Lehmann proposes to use a third row of hydrostatic bearing elements between two neighboring rows and adjacent the nip (reference may be had to FIG. 5 of this publication). It has been found that such proposal is unsatisfactory because the outer rows of bearing elements can cause excessive deformation of the shell at locations which are spaced apart from the plane including the axes of the rolls which define the nip.

German Offenlegungsschrift No. 30 22 491 (which corresponds to commonly owned U.S. Pat. No. 4,394,793 to Pav et al.) discloses a pressure roll with a row of substantially oval or elliptical hydrostatic bearing elements (see FIG. 3) which are relatively short in the axial direction of the shell but extend to both sides of and well beyond the plane including the axes of neighboring rolls which define a nip. Each such bearing element is acted upon by two cylinder and piston units which are disposed at opposite sides of the aforementioned plane. This eliminates many problems which arise in connection with the utilization of other prior art bearing elements. Each bearing element of Pav et al. can be said to constitute an elongated bridge which extends in the circumferential direction of the shell and overlies the respective pistons. Each bridge can take up and/or transmit large forces and, being relatively short in the axial direction of the shell, each bridge can be used to effect a highly accurate adjustment of the shape and/or position of the respective portion of the shell. It has been found that the roll of Pav et al. can employ a relatively thin (i.e., readily deformable) shell which contributes to accuracy with which the nip can be selected and maintained when the roll is in use. Neighboring bearing elements have parallel facets which extend in the circumferential direction of the shell; this renders it possible to place such neighboring bearing elements close to each other and to thus allow for accurate adjustment of the positions of a large number of shell portions relative to each other and relative to the neighboring roll. However, the need for the provision of several cylinder and piston units for each bearing element contributes to complexity of the supporting device and of the entire roll as well as to complexity of the controls which regulate the admission of hydraulic fluid into and evacuation of hydraulic fluid from the cylinder chambers for the pistons

OBJECTS AND SUMMARY OF THE INVENTION

An object of the invention is to provide a pressure roll which exhibits the advantages of rolls with relatively short but wide hydrostatic bearing elements as well as the advantages of rolls wherein each bearing element is propped by several cylinder and piston units.

Another object of the invention is to provide novel and improved hydrostatic supporting devices for use in the above outlined roll.

A further object of the invention is to provide novel and improved hydrostatic bearing elements and novel and improved cylinder and piston units for use in the above outlined pressure roll.

An additional object of the invention is to provide a roll wherein the bearing elements can stand and transmit pronounced deforming and/or adjusting or shape-regulating and position-altering stresses without risking permanent or excessive temporary deformation of the shell.

Still another object of the invention is to provide a roll which can be used in many existing machines as a superior substitute for conventional rolls.

A further object of the invention is to provide a machine which embodies the above outlined roll.

Another object of the invention is to provide the roll with novel and improved means for ensuring proper support for each and every portion of each bearing element.

An additional object of the invention is to provide a roll wherein the admission and evacuation of the fluid medium can be regulated by relatively simple, compact and inexpensive control means.

Another object of the invention is to provide a roll wherein the bearing elements can stand large transverse forces even though each such bearing element can be mounted on a single cylinder and piston unit.

The invention is embodied in a pressure roll for use in calenders and like machines. The improved roll comprises an elongated carrier (e.g., an elongated beam whose ends are non-rotatably held in the frame of a calender), a deformable hollow cylindrical shell which surrounds and is movable radially of the carrier, and primary supporting means interposed between the shell and the carrier and comprising a plurality of hydrostatic bearing elements which form a row extending in substantial parallelism with the axis of the shell. Each bearing element has a predetermined width and a length less than the width, and the supporting means further comprises means for biasing the bearing elements against the shell. Each biasing means includes a piston provided on one of the parts including the carrier and the respective bearing element, and a complementary cylinder chamber for the piston in the other part. Each piston has a predetermined width and a length less than its width. The widths of the bearing elements and pistons are measured in the circumferential direction and their lengths are measured in the axial direction of the shell. The length and width of each piston can approximate (i.e., these parameters need not be appreciably less than) the length and width of the respective bearing element.

Each piston has a peripheral surface which preferably includes two substantially parallel facets extending in the circumferential direction of the shell. Furthermore, each such peripheral surface can include two convex portions (particularly two semicylindrical portions) which alternate with the facets of the respective peripheral surface. Alternatively, each peripheral surface can further comprise two additional facets which are substantially parallel to the axis of the shell and alternate with the facets of the respective peripheral surface. The cross-sectional outlines of the pistons and cylinder chambers preferably resemble the cross-sectional outlines of the respective bearing elements.

Those surfaces of the bearing elements which are adjacent the internal surface of the shell are provided with pockets forming rows extending in the circumferential direction of the shell, and each bearing element is further formed with channels which connect its pockets with the respective cylinder chamber. Each channel can constitute or contain (include) a flow restrictor.

The roll can further comprise additional or secondary supporting means which is disposed substantially diametrically opposite the primary supporting means with reference to the axis of the shell. The additional supporting means can comprise a plurality of hydrostatic bearing elements forming a second row which extends in substantial parallelism with the axis of the shell. The length of the row of bearing elements forming part of the additional supporting means may but need not equal the length of the row of bearing elements which form part of the primary supporting means. The bearing elements of the additional supporting means may but need not be identical with the bearing elements of the primary supporting means, and each bearing element of the additional supporting means can be acted upon by biasing means similar to or identical with the biasing means of the primary supporting means.

The pistons are preferably provided on the carrier and the cylinder chambers are then formed in the respective bearing elements.

The roll further comprises a source of pressurized hydraulic fluid, means for connecting the source with the cylinder chambers of the biasing means, and means for regulating the pressure of fluid in at least some of the connecting means independently of each other. For example, the biasing means of the primary and/or secondary supporting means can form two or more groups each of which includes two or more cylinder chambers.

It is further possible to heat the pressurized hydraulic fluid in the source or on its way into the cylinder chambers.

The width of each bearing element can equal or approximate a multiple of (e.g., twice) the length of such bearing elements. The same applies for the pistons.

The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
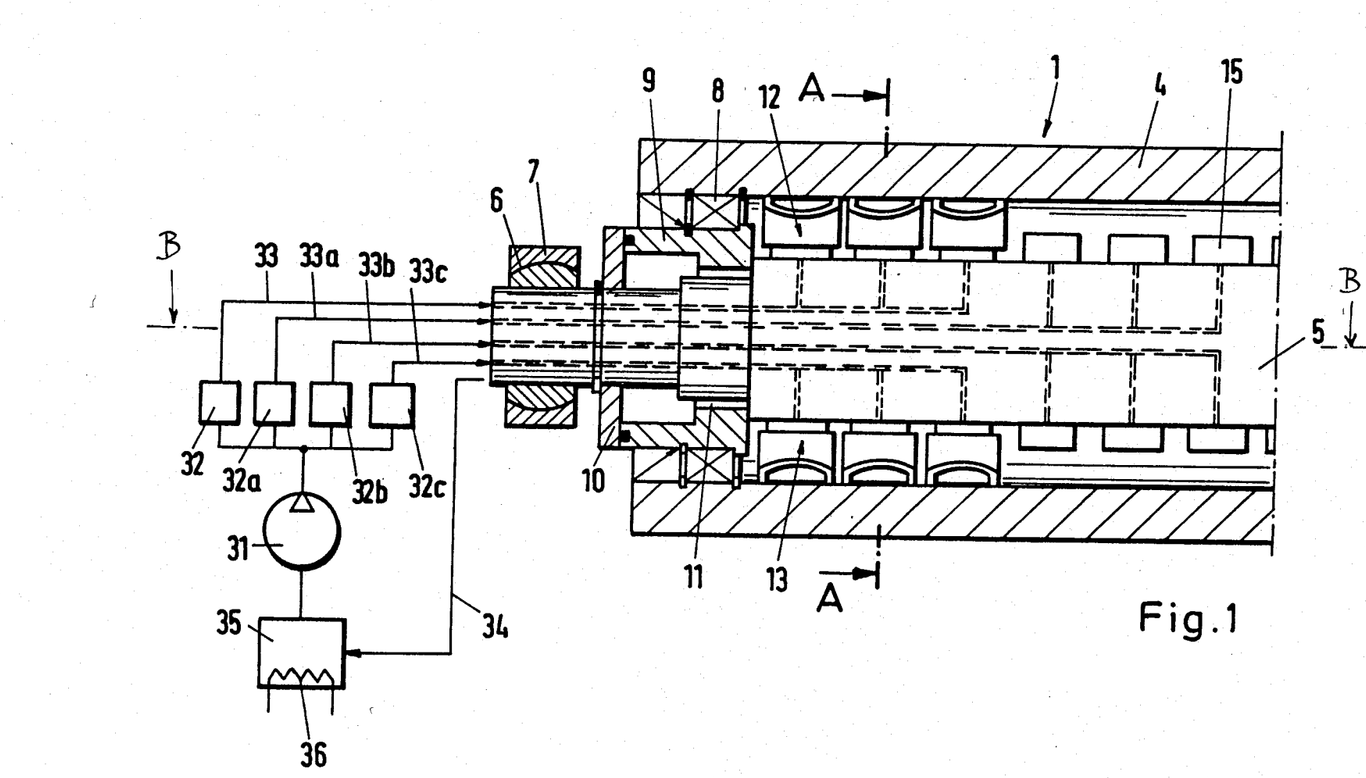
FIG. 1 is a fragmentary partly elevational and partly vertical axial sectional view of a pressure roll which embodies one form of the invention and has primary and secondary supporting means with hydrostatic bearing elements, pistons and cylinder chambers having a substantially elliptical or oval cross-sectional outline.
Figure 2:
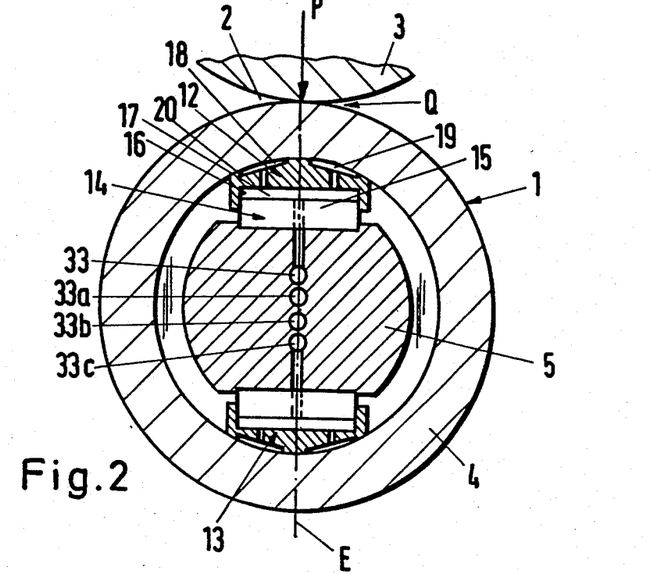
FIG. 2 is a transverse vertical sectional view as seen in the direction of arrows from the line A—A of FIG. 1.
Figure 3:
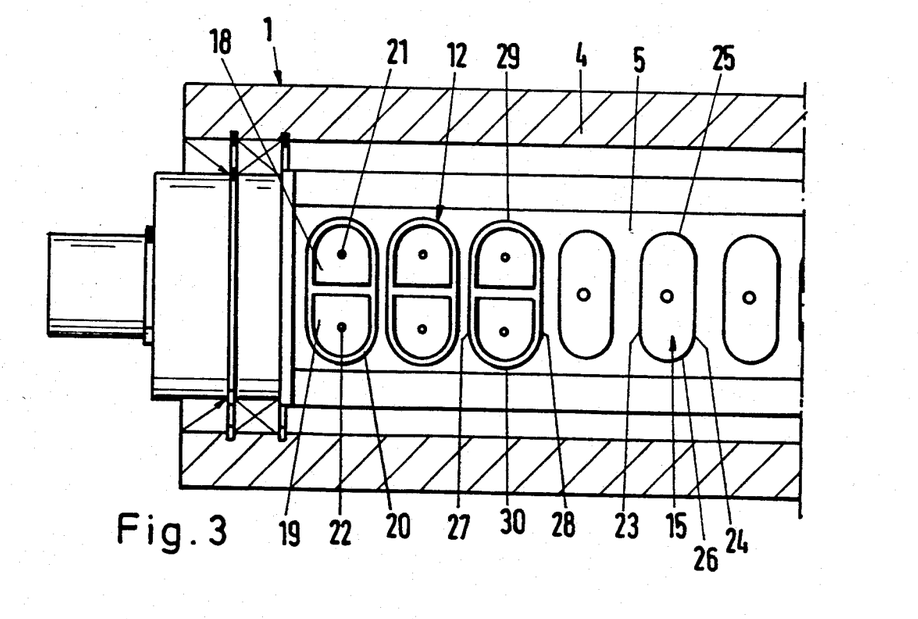
FIG. 3 is a horizontal sectional view substantially as seen in the direction of arrows from the line B—B of FIG. 1.

The pressure roll 1 which is shown in FIGS. 1-3 is or can be used with an identical or with a different roll 3 to form a nip 2 for a running web of paper, metallic or plastic foil, textile material or the like. Such rolls can be used in a calender, in a rolling mill or in any other machine wherein the width of a nip between two rotary bodies is to be controlled with a high or extremely high degree of accuracy.

The roll 1 comprises a stationary carrier 5 in the form of a horizontal beam with end portions which are mounted in spherical bearings 6 within a frame 7 in such a way that the carrier cannot rotate about its axis. The roll 1 also comprises a hollow cylindrical shell 4 which surrounds and is rotatable about as well as movable radially relative to the carrier 5. The shell 4 can be rotated by a drive (not shown) or by the running web which passes through the nip 2. The end portions of the shell 4 surround antifriction bearings 8 which, in turn, surround discrete sleeves 9 defining with the adjacent cylindrical portions or stubs of the carrier 5 annular clearances or gaps 11 which enable the shell 4 to move up and down counter to or under the action of a force P shown in FIG. 2 and acting in a vertical plane E which includes the axes of the carrier 5, shell 4 and roll 3. The manner in which the sleeves 9 are held against rotation relative to the carrier 5 is not shown in the drawing; reference may be had, for example, to commonly owned copending patent application Ser. No. 87,578 filed Aug. 20, 1987 by Josef Pav et al. for "Pressure roll for use in calenders and the like". The carrier 5 supports a washer-like retaining member 10 for one or more sealing rings which engage the adjacent end face of the illustrated sleeve 9. The retaining member 10 is an integral part of or is non-rotatably affixed to the respective end portion of the carrier 5. The non-illustrated right-hand part of the roll 1 is a mirror image of the part which is shown in FIG. 1.

The shell 4 is carried by a primary supporting device including a row of identical hydrostatic bearing elements 12 each of which has a convex surface 20 adjacent the neighboring portion of the internal surface of the shell. A secondary or additional supporting device 13 is disposed diametrically opposite the supporting device including the bearing elements 12 and serves to pull the shell 4 downwardly so as to ensure that the topmost portion of the internal surface of the shell is urged toward the convex surfaces 20 of the bearing elements 12. The bearing elements 12 serve to urge the shell 4 upwardly in order to oppose the force P, and the bearing elements of the secondary or additional supporting device 13 serve to assist the force P. Each bearing element includes two halves which are mirror symmetrical to each other with reference to the plane E.

The primary supporting device further includes a discrete biasing unit 14 for each hydrostatic bearing element 12, and each biasing unit 14 includes a piston 15 which is rigid or integral with the top portion of the carrier 5 and a cylinder chamber 17 which is complementary to and receives the respective piston 15. In accordance with a feature of the invention, the length of each piston 15 (as measured in the axial direction of the shell 4) is much less than (e.g., one-half) the width of the piston (as measured in the circumferential direction of the shell). This can be readily seen in FIG. 3 which further shows that the peripheral surface of each piston 15 includes two flat parallel facets or portions 23, 24 extending in the circumferential direction of the shell 4 and two convex (preferably semicylindrical) portions 25, 26 which alternate with the facets 23, 24. The configuration of the surfaces 16 bounding the cylinder chambers 17 is complementary to that of peripheral surfaces of the respective pistons 15. FIG. 3 also shows that the outline of each piston 15 is similar to that of the respective hydrostatic bearing element 12 as well as that the pistons are only slightly smaller than the respective bearing elements. Each piston 15 and each cylinder chamber 17 has two halves which are mirror symmetrical to each other with reference to the plane E, the same as the bearing elements 12 and preferably also the pistons, cylinder chambers and bearing elements of the secondary supporting device 13. The length of the row of hydrostatic bearing elements which form the secondary supporting device 13 may but need not equal the length of the row of bearing elements 12; it can be shorter as long as the number of hydrostatic bearing elements in the row forming part of the device 13 suffices to ensure that the upper portion of the shell 4 is urged downwardly toward the bearing elements 12 and that, if necessary, the shell 4 is actually shifted downwardly against the opposition of the biasing means 14 including the pistons 15.

The convex surfaces 20 of the bearing elements 12 have pockets 18, 19 which are disposed at opposite sides of the plane E (i.e., such pockets form rows which extend in the circumferential direction of the shell 4) and communicate with the respective cylinder chambers 17 by way of flow restricting channels or bores 21, 22 which are machined into or otherwise formed in the bearing elements 12. The number of pockets in each bearing element 12 can be increased to three or more.

The pistons 15 have a certain freedom of radial movement with reference to the surfaces 16 bounding the respective cylinder chambers 17. The sealing elements which prevent the escape of pressurized hydraulic fluid from the cylinder chambers 17 by way of such clearances are not shown in the dawing.

Each bearing element 12 has a peripheral surface including two portions or facets 27, 28 which are parallel to the facets 23, 24 of the respective pistons 15, and two convex (e.g., semicylindrical) portions 29, 30 which alternate with the facets 27, 28. FIG. 3 shows that the curvature of the convex portions 29, 30 matches or approximates that of the convex portions 25, 26. It will be noted that several bearing elements 12 were omitted in FIGS. 1 and 3 for the sake of clarity.

The distance between neighboring bearing elements 12 can be a fraction of one centimeter, e.g., in the range of 2 mm. This renders it possible to employ a large number of bearing elements 12 each of which can change the level and/or shape of the adjacent portion of the shell 4 in order to ensure that the width of the nip 2 will match or closely approximate an optimum value. The dimensions of bearing elements and biasing units in the secondary supporting device 13 can equal or approximate those of the bearing elements 12 and biasing units 14.

The cylinder chambers 17 receive pressurized hydraulic fluid from a source including a tank 35 and a pump 31. The means for connecting the source 31, 35 with the chambers 17 includes a plurality of conduits including those denoted by the characters 33, 33a, 33b and 33c. Each of these conduits can deliver pressurized fluid to a group of three neighboring cylinder chambers 17, and each of these conduits contains a discrete pressure regulating device 32, 32a, 32b, 32c. The manner in which the pressure of fluid in the cylinder chambers 17 can be regulated in order to alter the level and/or the shape of the shell 4 is well known in the art and need not be described here. Reference may be had to numerous United States and foreign patents of the assignee of the present application. The fluid which is admitted into the cylinder chambers 17 flows through the flow restricting channels 21, 22 to enter the respective pockets 18, 19 and to leak along the convex surfaces 20 of the bearing elements 12 to enter the interior of the shell 4. A return conduit 34 is provided to convey leak fluid from the interior of the shell 4 into the tank 35. The latter contains a heating element 36 of any known design to maintain the temperature of the hydraulic fluid (e.g., a suitable oil) within a desired range. Each of the conduits 33-33c and 34 can include a portion which constitutes a channel or bore in the carrier 5 (note FIG. 2).

Since the cross-sectional area of each piston 15 almost equals the cross-sectional area of the respective bearing element 12, the convex surfaces 20 of the bearing elements 12 are urged toward the internal surface of the shell 4 with a great force even if the pressure of hydraulic fluid in the cylinder chambers 17 is relatively low. In other words, the primary supporting device can act upon the shell 4 with a great force per unit length of the shell. Moreover, such force is distributed through a large angle in the circumferential direction of the shell 4 because the width of each cylinder chamber 17 can greatly exceed its length. Still, further, all portions of each bearing element 12 are subjected to the action of equal or nearly equal forces so that the bearing elements adequately prop the shell 4 not only in the plane E but also within relatively large angles at both sides of such plane. The pressure regulating or adjusting devices 32-32c are actuated, normally in response to signals from automatic monitoring means, to vary the pressure of hydraulic fluid in selected groups of chambers 17 to thus alter the shape of the corresponding portions of the shell 4 and/or to determine the width of the nip 2 between the peripheral surface of the shell and the peripheral surface of the adjacent roll 3. The configuration of the shell 4 can be regulated with a high degree of accuracy so as to ensure that the outline of the shell in the region of the nip 2 will be exactly complementary to that of the roll 3. This ensures that the shell 4 can stand the force P which acts in the plane E and is counteracted by the row of hydrostatic bearing elements 12.

If the shell 4 is simultaneously subjected to the action of transverse forces Q (e.g., in response to a pull which is exerted by a running web advancing through the nip 2), the forces Q are readily taken up by the bearing elements 12 because these elements are configured in the aforedescribed manner, namely the width of each element 12 in the circumferential direction of the shell considerably or greatly exceeds its length (as measured in the axial direction of the shell). The force Q is also counteracted by the bearing elements of the secondary supporting device 13 since these bearing elements also extend well beyond both sides of the plane E. When a transverse force Q develops while the roll 1 is in use, portions of the surfaces 16 bounding the cylinder chambers 17 bear against the adjacent portions of the peripheral surfaces of the respective pistons 15 so that the pistons can transmit forces to the carrier 5. The ability of bearing elements 12 and of the bearing elements forming part of the secondary supporting device 13 to transmit transverse forces to the carrier 5 is enhanced if the cylinder chambers of the biasing units in the secondary supporting device 13 receive pressurized hydraulic fluid because the shell 4 is then held without play between the upper and lower rows of bearing elements.

An advantage of the improved roll 1, and especially of its supporting devices (12, 14-20 and 13) is that each hydrostatic supporting element is propped by the respective biasing unit (such as 14) in the plane E as well as in the regions extending in the circumferential direction of the shell 4 and well beyond both sides of such plane. Moreover, each biasing unit 14 provides an uninterrupted support for the respective bearing element all the way between the convex portions of the peripheral surface of the respective piston. As can be seen in FIG. 3, each bearing element 12 is supported by the respective piston 15 all the way between the apices of the convex portions 25, 26 of the peripheral surface of such piston. Therefore, each bearing element constitutes a rigid support whose stability (rigidity) is constant or practically constant all the way between the apices of the convex portions 29, 30 of its peripheral surface. Consequently, each bearing element can stand and can also transmit very high pressures without any, or without any appreciable, deformation. Alternatively, and if the anticipated pressures in the cylinder chambers of the biasing units and in the pockets of the bearing elements are relatively low, the roll can employ lightweight and inexpensive bearing elements without risking undue deformation of such bearing elements and/or unsatisfactory shifting and/or deformation of the shell.

Another advantage of the improved roll and of its supporting devices is that the configuration of each piston approximates or equals the configuration of the respective bearing element and that the dimensions of the pistons are only slightly smaller than those of the corresponding bearing elements. This ensures that each bearing element is adequately supported practically all the way between its parallel facets 27, 28. All in all, the effective crosssectional area of each piston 15 and of each bearing element 12 is much greater than in conventional rolls. The sum of these features ensures a highly satisfactory propping of the shell 4 and a highly satisfactory distribution and application of pressures in the axial and in the circumferential direction of the shell. Moreover, it is possible to employ a large number of relatively short bearing elements (as considered in the axial direction of the shell 4) so that the regulating devices 32-32c can be operated to accurately select the configuration of the shell 4 in the region of the nip 2 as well as to accurately select the width of the nip. It is possible to employ a relatively thin and readily deformable shell 4 because the shell is adequately supported in as well as at both sides of the plane E by a row of closely adjacent supporting elements each having a width which at least slightly (but preferably substantially) exceeds its length.

It has been found that the improved roll can be used with great advantage in paper making and processing machines wherein the rolls are called upon to stand and transmit large forces. Moreover, the improved roll can be used with advantage in calenders, in rolling mills for aluminum and steel as well as in machines for the processing of plastic materials, rubber, metallic foils and webs or sheets of textile material.

While it is equally within the purview of the invention to employ pistons whose cross-sectional outline deviates from the illustrated outline and from the outlines of the respective bearing elements, pistons having peripheral surfaces with facets (23, 24) which are parallel to each other and extend in the circumferential direction of the shell 4 are preferred at this time because they can provide adequate support for the bearing elements and render it possible to place a large number of bearing elements close to each Other in the form of a row wherein the bearing elements extend well beyond both sides of the plane E. Moreover, the cost of making pistons having peripheral surfaces with parallel facets and with surface portions which resemble or constitute substantially semicylindrical surfaces is relatively low.

When the hydraulic fluid which is used in the hydrostatic supporting devices is cold or unheated, its pressure can be raised to 50–500 bar. If the hydraulic fluid is heated (this is desirable if the fluid is used to influence the temperature of the corresponding sections of the shell 4), its pressure normally does not exceed 12–20 bar because operation with heated fluid at pressures above such range would entail damage to and/or destruction of pumps, sealing elements and other sensitive parts which are contacted by heated fluid. Since the improved roll renders it possible to operate at a maximum load per unit length of the shell (at a given pressure of the fluid medium), such roll can be used with particular advantage when the fluid is heated or when the fluid should be heated.

Figure 4:
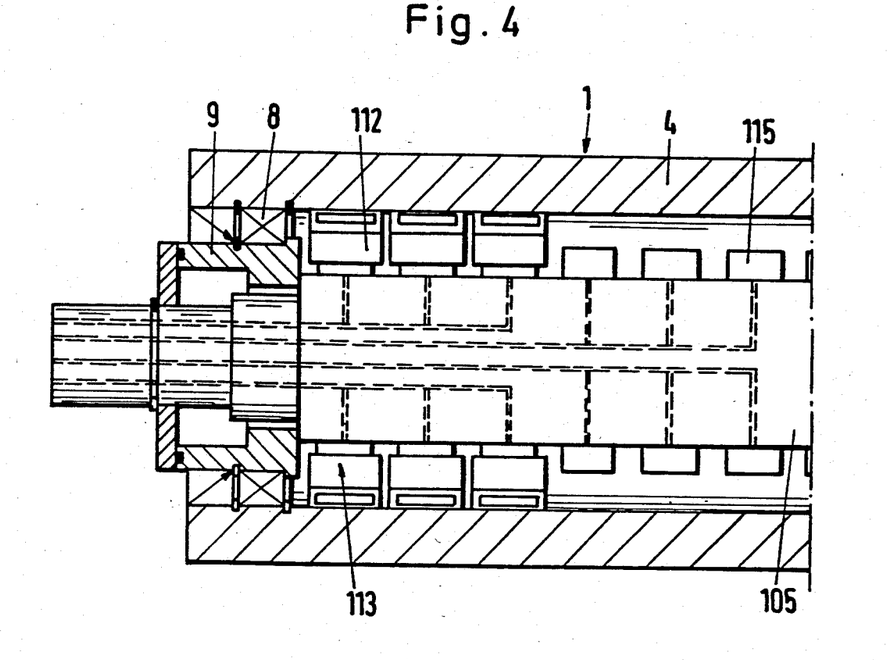
FIG. 4 is a fragmentary vertical axial sectional view of a modified pressure roll wherein each bearing element, piston, and cylinder chamber has a substantially rectangular cross-sectional outline.
Figure 5:
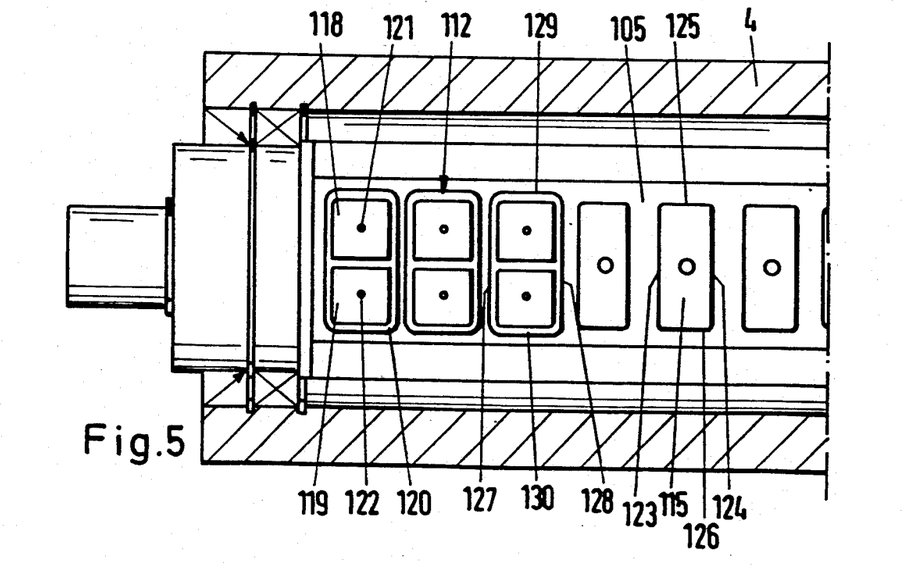
FIG. 5 is a horizontal axial sectional view of the modified pressure roll.

The pressure roll 1 of FIGS. 4 and 5 differs from the roll 1 of FIGS. 1 to 3 primarily in that it comprises differently configurated hydrostatic bearing elements (including the bearing elements 112 forming part of the primary supporting device and the preferably identical hydrostatic bearing elements forming part of the secondary supporting device 113) and pistons and cylinder chambers whose outlines are similar or practically identical to those of the bearing elements. As can be seen in FIG. 5, the peripheral surface of each bearing element 112 has two parallel longer sides or facets 127, 128 extending transversely of the vertical plane in which the section of FIG. 4 is taken, and two shorter surface portions or facets 129, 130 which are parallel to the axis of the shell 4 and alternate with the facets 127, 128. Analogously, the peripheral surface of each piston 115 has two parallel facets 123, 124 which extend transversely of the axis of the shell 4 and two much shorter surface portions 125, 126 which alternate with the facets 123, 124 and are parallel or nearly parallel to the axis of the shell 4. The configuration of surfaces bounding the cylinder chambers for the pistons 115 is preferably complementary to that of the peripheral surfaces of the respective pistons. The same preferably applies for the pistons and cylinder chambers in the secondary supporting device 113. The convex surface 120 of each supporting element 112 has two substantially square pockets 118, 119 which are disposed at opposite sides of the aforementioned vertical plane including the axis of the shell 4, and such pockets receive pressurized hydraulic fluid through flow restricting bores or channels 121, 122. The carrier 105 is or can be similar with or identical to the carrier 5 of FIGS. 1 to 3. The manner in which the cylinder chambers of the biasing units in the two supporting devices receive hydraulic fluid at a selected pressure is or can be the same as described in connection with FIG. 1.

An advantage of the bearing elements 112 is that the effective cross-sectional area of each bearing element is even larger than that of an element 12. Moreover, bearing elements having a simple polygonal outline can be mass-produced at a reasonable cost.

The improved roll is susceptible of many additional modifications. For example, the bearings (such as 8) for the end portions of the shell 4 can be mounted directly on the adjacent portions of the carrier 5 or 105. Furthermore, hydrostatic bearing elements 112 having a rectangular outline can be used in combination with substantially elliptical pistons 15 or with otherwise configurated pistons each of which extends well beyond both sides of the plane E. Inversely, the substantially oval or elliptical bearing elements 12 of the roll 1 shown in FIGS. 1 to 3 can be used with pistons 115 having a substantially rectangular outline. Still further, the biasing units can comprise pistons which are provided on the bearing elements and extend into cylinder chambers provided therefor in the carrier 5 or 105. The provision of cylinder chambers in the bearing elements is preferred at this time because this contributes to compactness, simplicity and lower cost of the bearing elements. Moreover, the carrier 5 or 105 is not unduly weakened by the provision of one or more rows of cylinder chambers therein.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A roll for use in calenders and in like machines, comprising an elongated carrier; a deformable hollow cylindrical shell surrounding and movable radially of said carrier; and supporting means interposed between said shell and said carrier and comprising a plurality of hydrostatic bearing elements forming a row extending in substantial parallelism with the axis of said shell, each of said elements having a predetermined width and a length less than said width and said supporting means further comprising means for biasing said bearing elements toward said shell, each of said biasing means including a single piston provided on one of the parts including said carrier and the respective bearing element and a complementary cylinder chamber for the piston in the other of said parts, each of said pistons having a predetermined width and a length less than the width, said widths being measured in the circumferential direction and said lengths being measured in the axial direction of said shell.

2. The roll of claim 1, wherein the width and the length of each of said pistons approximate the width and the length of the respective bearing elements.

3. The roll of claim 1, wherein each of said pistons has a peripheral surface including two substantially parallel facets extending in the circumferential direction of said shell.

4. The roll of claim 3, wherein each of said peripheral surfaces further includes two convex portions which alternate with the facets of the respective piston.

5. The roll of claim 4, wherein each of said convex portions has a semicylindrical outline.

6. The roll of claim 3, wherein each of said peripheral surfaces further comprises two additional facets which are substantially parallel to the axis of said shell and alternate with said parallel facets of the respective piston.

7. The roll of claim 1, wherein each of said pistons has a first cross-sectional outline and each of said bearing elements has a second cross-sectional outline which is similar to the cross-sectional outline of the respective piston.

8. The roll of claim 1, wherein each of said bearing elements has a surface adjacent said shell and each of said surfaces has a plurality of pockets forming a row extending in the circumferential direction of said shell, each of said bearing elements further having channels connecting said pockets with the respective cylinder chamber.

9. The roll of claim 8, wherein each of said channels includes or constitutes a flow restrictor.

10. The roll of claim 1, further comprising additional supporting means disposed substantially diametrically opposite said first named supporting means with reference to the axis of said shell.

11. The roll of claim 10, wherein said additional supporting means includes a plurality of hydrostatic bearing elements forming a second row extending in substantial parallelism with said first named row, the length of said second row at most matching the length of said first named row.

12. The roll of claim 1, wherein said pistons are provided on said carrier and said cylinder chambers are provided in the respective bearing elements.

13. The roll of claim 1, further comprising a source of pressurized hydraulic fluid, means for connecting said cylinder chambers with said source, and means for regulating the pressure of fluid in at least some of said connecting means independently of each other.

14. The roll of claim 1, further comprising a source of pressurized hydraulic fluid, means for heating the fluid, and means for connecting said source with said cylinder chambers.

15. The roll of claim 1, wherein the width of each of said bearing elements is or approximates a multiple of the length of such bearing elements.

16. The roll of claim 1, wherein the width of each of said pistons is or approximates a multiple of the length of such pistons.

* * * * *

UNITED STATES PATENT AND TRADEMARK OFFICE
CERTIFICATE OF CORRECTION

PATENT NO.  : 4,805,279
DATED       : February 21, 1989
INVENTOR(S) : Josef PAV

It is certified that error appears in the above-identified patent and that said Letters Patent is hereby corrected as shown below:

Foremost Page: Foreign Application Priority Data was omitted and should read --Sep. 3, 1986, European, 86112187--.

Signed and Sealed this

Nineteenth Day of March, 1991

Attest:

HARRY F. MANBECK, JR.

*Attesting Officer*   *Commissioner of Patents and Trademarks*